US005604318A

United States Patent [19]

Fasshauer

[11] Patent Number: 5,604,318

[45] Date of Patent: Feb. 18, 1997

[54] OPTICAL PRESSURE DETECTOR

[75] Inventor: Peter Fasshauer, Neubiborg, Germany

[73] Assignee: Waldemar Marinitsch, Munich, Germany

[21] Appl. No.: 514,359

[22] Filed: Aug. 11, 1995

[30] Foreign Application Priority Data

Aug. 12, 1994 [DE] Germany .......................... 44 28 650.3

[51] Int. Cl.[6] ............................ G01L 1/24; G08B 13/186

[52] U.S. Cl. ................. 73/862.624; 73/705; 250/227.16; 250/231.19; 340/555

[58] Field of Search ......................... 250/231.19, 227.16, 250/231.1; 340/555, 556, 590; 73/705, 800, 855, 856, 862.624, 862.625

[56] References Cited

U.S. PATENT DOCUMENTS

| | | | |
|---|---|---|---|
| 4,800,267 | 1/1989 | Freal et al. | 73/514.26 X |
| 5,012,679 | 5/1991 | Haefner | 73/800 |

FOREIGN PATENT DOCUMENTS

| | | |
|---|---|---|
| 38720 | 3/1986 | Austria . |
| 0131474 | 7/1984 | European Pat. Off. . |
| 9111359 | of 0000 | Germany . |
| 3325945A1 | 7/1983 | Germany . |
| 3802527 | 1/1988 | Germany . |

OTHER PUBLICATIONS

"Optical Fiber Sensor Technology" by Thomas S. Giallorenzi et al., *IEEE Journal of Quantum Electronics* vol. QE-18, No. 4, Apr. 1982.

*Primary Examiner*—Hezron E. Williams
*Assistant Examiner*—Joseph L. Felber
*Attorney, Agent, or Firm*—Lowe, Price, LeBlanc & Becker

[57] ABSTRACT

The invention relates to an optical pressure detector for instance in the form of an optical alarm with a multimode light guide (1) imbedded in a contact pad (2) subject to pressure, said light guide being curved by the compression of the contact pad (2). The light guide (1) is mounted between a light source and a light detector, an analyzer being present to analyze the output signals from the light detector changing through mode coupling as a function of the applied pressure, and to process them for instance into an alarm signal. The light detector covers an angle of aperture at the exit of the light guide (1), said angle only enclosing the radiation field in the range of lower-order modes of the light guide (1).

13 Claims, 4 Drawing Sheets

OPTICAL PRESSURE DETECTOR

FIELD OF THE INVENTION

The invention concerns an optical pressure detector of the type disclosed in the German Gebrauchsmuster 9,111,359.

BACKGROUND OF THE INVENTION

Optical pressure detectors with a light-guide affixed to a contact pad are used illustratively as optical alarms sensing a change in the compression applied to the contact pad for instance by someone stepping on it or by removing an object previously resting on it and then triggering a corresponding alarm signal; they are also used in pressure sensors such as weighing scales with which the weight of an object on the contact pad can be measured.

Such pressure detectors operate on a physical principle described illustratively by T. G. *Giallenzori* et al in "Optical Fiber Sensor Technology", IEEE Journal of Quantum Electronics, QE 18, #4, April 1982. Thereby a compression of the contact pad or the decrease in compression of such a pad entails a change in the light-guide curvature in turn entailing a change in light transmission from the light source to the light detector. The change in light passing through the light guide sensed by the detector is analyzed and, depending on the application, is transduced into an alarm or measurement signal.

Such light-guide curving may be achieved in a number of ways. One way, is to configure the contact pad inside and at least on one side of the light guide in spatially periodic manner, whereby the compression applied to the contact pad is transmitted at periodically spaced sites to the light guide which thereby is then periodically curved.

Another way to achieve periodic curving of the light guide and illustratively described in the European patent document 0,131,474 B1, is to coil a metallic helix around the light guide, said helix being would at a constant pitch around it. In this embodiment, the compression applied to the contact pad is transmitted through the helix to the light guide which thereby is curved periodically.

A common feature of the known pressure detectors is that the losses of transmitted light produced by the curvature of the light guide, which as a rule will be a fiber optics, are detected and analyzed. The particular sensitivity depends on the extent of the deformation of the light guide and on the ensuing light loss of the light moving through the light guide.

The object of the invention is to so design an optical pressure detector evincing a higher sensitivity.

SUMMARY OF THE INVENTION

The embodiment of the invention is based on the concept that higher sensitivity can be achieved when mode coupling is used to detect the compression wherein the light power of low-order modes moves over into higher order modes when the light guide is being curved, without incurring thereby a change in total transmitted light power, i.e., in the absence of real losses. As a consequence of mode coupling, the far-field distribution of the light issuing from the light guide will spread at the contact pad in the presence of compression at the contact point. With the total power remaining constant, no difference would be found between the light guide being stressed or not when analyzing the full mode field. In the invention, however, the light detector is designed in such a way that only the radiation field in the vicinity of the low-order modes is analyzed, and as a result, the substantial change in the partial energy in this zone can be determined and analyzed as a function of the presence of compression of the contact pad and hence at the light guide.

Mode coupling being an effect which manifests itself already at very low stresses and curvatures of the light guide, the pressure detector of the invention will offer the desired, high sensitivity.

BRIEF DESCRIPTION OF THE DRAWINGS

Especially preferred embodiments of the invention are elucidated below in relation to the associated drawing.

DETAILED DESCRIPTION OF THE PREFERRED EMBODIMENTS

Figure 1A:
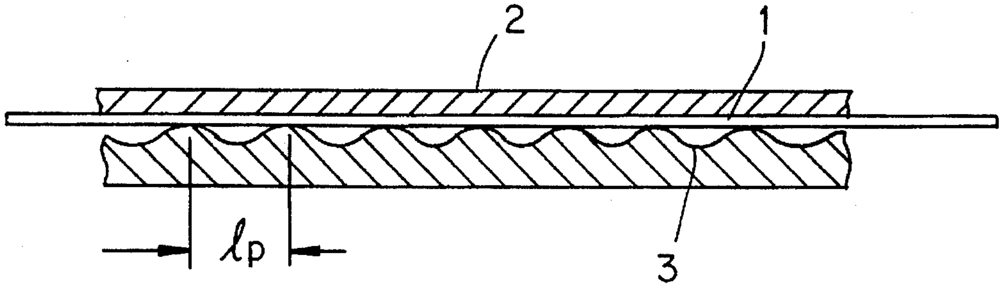
FIG. 1*a* is a cross-section of the light guide mounted in a contact pad for a first embodiment of the pressure detector.

The pressure detector shown in the drawings in particular represents an optical alarm with an optical contact sensor in the form of a light guide constituted by a fiber optics cable 1 imbedded in a contact pad 2 illustratively composed of rubber or plastic. The fiber optics cable 1 may be mounted in the form of a loop over a given surface in the contact pad 2, as a result of which the optics fiber cable 1 shall be compressed when said pad resting on a secured floor area is being stepped on.

Figure 1B:
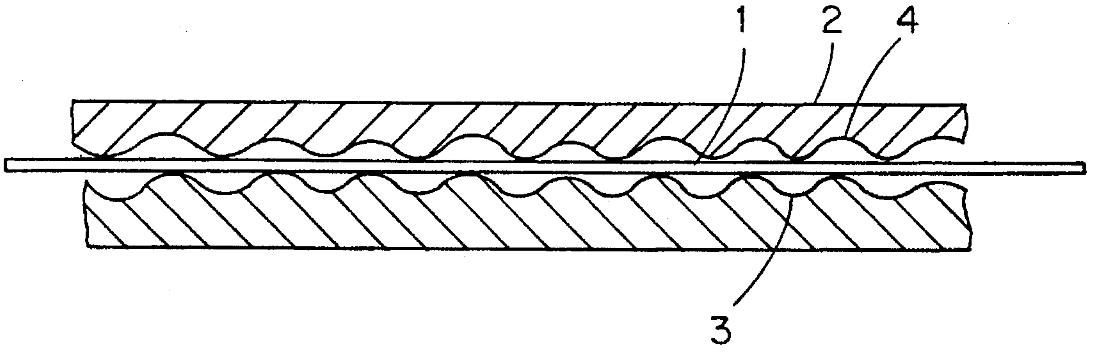
FIG. 1*b* shows the light guide in a contact pad for a second embodiment of the pressure detector.

As shown in FIG. 1*a*, the contact pad 2 assumes a spatially periodic configuration on one side of the fiber optics cable 1 in the direction of the applied pressure - in this instance, at the underside of the fiber optics cable 1 - - -, in other words, it assumes a waveshape 3, and hence a compression exerted on the contact pad will lead to a corresponding spatially periodic curvature of the fiber optics cable 1. As shown by FIG. 1*b*, the contact pad 2 also may be fitted on the inside on both sides facing each other in the direction of compression with corresponding contours 3, 4, whereby sensitivity is further enhanced. Appropriately the contact pad 2 consists of two pad parts enclosing the fiber optics cable 1. This is a simple and economical design. Spatially periodic compression points also may be generated by an appropriate layer such as a grid to which the fiber optics cable 1 is affixed for instance by stitching. Any compression points generating layer is appropriate. Again such a layer may be sandwiched between two planar The system shown in FIGS. 1*a* and 1*b* is mounted between a light source, for instance a laser diode, and a light detector, so that the light, for instance in the form of pulses, from the light source passes through the fiber optics cable 1 and at the exit of this optics is detected by the light detector. The light detector output signals are analyzed in an analyzer.

In order to linearize the relation between signal voltage and weight stressing, the top side of one of the pads may be composed of a rubbery material with a plurality of small plates transmitting the compression to the fiber optics cable, each small plate spreading the partial weight it supports over a length of fiber determined by the plate size. The smaller the plate area, the less the voltage output from the light detector at constant weight, such weights then being applied to a shorter fiber distance. If the total weight G is composed of weight elements Gi, for instance in the event of stressing because of more than one person stepping on the pad, then the signal voltage generated by one weight element is less for the small-plate configuration than if it were to load the full pad surface. As a result, advantageous linearization is achieved and the relation between signal voltage and stressing is extended.

The fiber optics cable 1 is a multi-mode fiber with a stepped index of refraction, that is, it is a fiber optics cable of which the index of refraction changes step-wise between the core and the sheath, as contrasted with a fiber optics cable evincing a gradient index-of-refraction as conventionally used in known pressure detectors and wherein the index of refraction changes continuously. This feature of the invention offers the advantage that, with the spatially periodic configuration, namely with the corrugated contour 3,4 shown in FIGS. 1*a* and 1*b*, larger tolerances are permitted. A sharply defined resonance is absent for the sensitivity that would be achieved only when rigorously observing a definite pitch of said spatial periods as is the case when using a multimode fiber with a gradient index-of-refraction.

The above feature can be demonstrated as follows:

Because of the periodic curvature of the light guide, that is of the fiber optics cable 1, power coupling, namely mode coupling, takes place between adjacent modes. This effect is especially marked if, for a mechanical periodic distance $1_p$ of the configuration 3, or 3, 4 determining the curvature of the fiber optics cable 1 between adjacent modes of order m and m+1, the following is the case:

$$\Delta\phi=\beta_{m+1}1_p-\beta_m 1_p=2\pi \tag{1}$$

where $\Delta\phi$ is the phase difference of a mode having the order number (m+1) and the adjacent mode with the order number (m) after the light has passed the periodic distance $1_p$ of the deformation of the light guide, and $\beta_m$ is the phase constant for the mode of order m.

For a stepped-index-of-refraction fiber optics, eq. 1 results in $$\Delta\beta=\beta_{m+1}-\beta_m=2\frac{\sqrt{\Delta}}{a}\ \frac{m}{M} \tag{2}$$

where $\Delta$ is the relative difference of index of refraction, a is the core radius and M is the total of all modes.

On the other hand, as regards a gradient index-of-refraction fiber, the following holds $$\Delta\beta=\frac{\sqrt{2\Delta}}{a} \tag{3}$$

It follows from eqs. 2 and 3 that as regards a stepped index-of-refraction fiber, the phase difference and hence the mode coupling depends on the mode number m, whereas it is independent thereof as regards a gradient index-of-refraction fiber. This means that there is only one period $1_p$ for a gradient index-of-refraction fiber at which maximum mode coupling will take place. The applicable equation is $$l_p=\frac{2a\pi}{\sqrt{2\Delta}} \tag{4}$$

Accordingly a sharply defined resonance takes place for a gradient index-of-refraction fiber and must be rigorously observed: this feature entails costs in manufacturing the periodic configuration 3, 4.

On the other hand, as regards a stepped index-of-refraction fiber and making use of the numerical aperture of the fiber, namely $A_n=n\sqrt{2}\Delta$, that coupling of adjacent modes will take place when $$l_p=\frac{\sqrt{2}\ a\pi n}{A_n}\ \frac{M}{m}. \tag{5}$$

Eq. 5 shows that each mode m requires another period distance $1_p$ for complete mode coupling, with the larger $1_p$, the lower the order of the particular mode.

Preferably the period distance $1_p$ is selected in such manner when employing a stepped index-of-refraction fiber that M/m is about 2, whereby mode coupling mainly will take place at low-order modes because partial coupling also takes place in the vicinity of mode m=M/2. If for instance using a stepped index-of-refraction fiber optics with a=0.1 mm, $A_n$=0.3 and if the index of refraction of the fiber core is n=1.5, then a period distance $1_p$ of about 5 mm is obtained from eq. 5.

Commercially available HCS (hard cladding silica) fibers may be used as stepped index-of-refraction fiber optics that evince, aside the required optical properties, also the required mechanical characteristics relative to the contact pad. The above period distance $1_p$ of the contours 3, 4 also is available in commercial economic contoured rubber pads which are immediately usable because the tolerances on the spatial period are mild, contrary to the case of gradient index-of-refraction fibers. Accordingly the design of the detector of the invention will be economical.

Operation of the above described pressure detector is elucidated below in further detail.

When the light source, for instance a laser diode, emits a light pulse to the light guide, that is the fiber optics cable 1, this pulse will travel through the fiber optics 1 as far as its exit where a light detector, for instance in the form of a photodiode, is affixed.

Figure 2A:
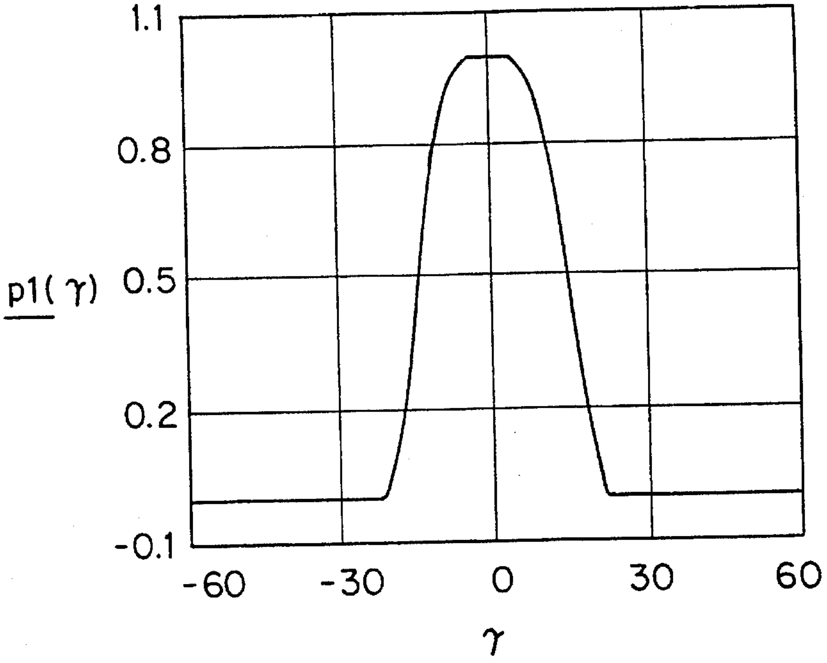
FIG. 2*a* shows the far-field distribution of the light issuing from the unstressed light guide.
Figure 2B:
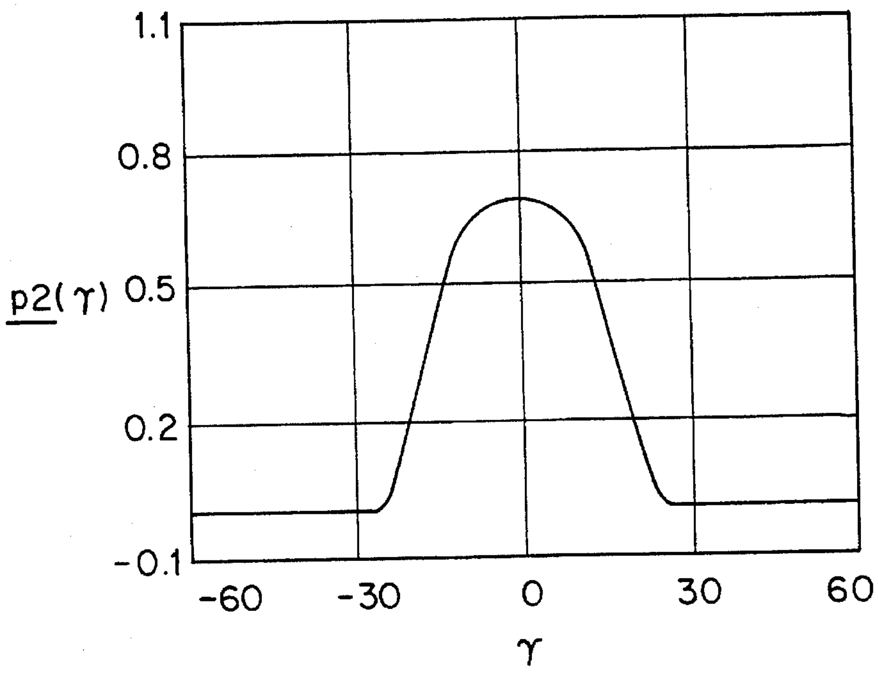
FIG. 2*b* shows the far-field distribution of the light issuing the stressed light guide.

The light exiting the fiber optics 1 evinces a far-field distribution P(γ) shown in FIG. 2*a*. P(Y) represent the angular distribution of the radiation power and is in units of watts per steradian. The curve of FIG. 2*a* relates to a given stressed state of the contact pad, that is of the fiber optics, which also may be the unstressed state. If on account of increasing stress, that is increasing compression of the contact pad, the fiber optics cable 1 is curved, and the above described mode coupling will take place, causing the far-field distribution P(γ) to change as shown by FIG. 2*b*. FIG. 2*b* shows that the field broadens while its peak value decreases, the total power of all modes however remaining constant.

Accordingly no difference would be found by analyzing the total mode field, for instance by taking the difference of the light powers received at the light detector and shown in FIGS. 2*a* and 2*b*, and accordingly the observer would not be able to infer a difference between the fiber optics cable being stressed or unstressed.

However a difference shall exist if analyzing solely the radiation field in the vicinity of the peak, namely the radiation field from the lower order modes. In that case the detected partial power evinces substantial changes depending on the stressed state and comprises 40 to 80%, preferably about 60% of the modes. The detection range of the modes of the total radiation field may begin at about 20% of the modes.

Figure 3:
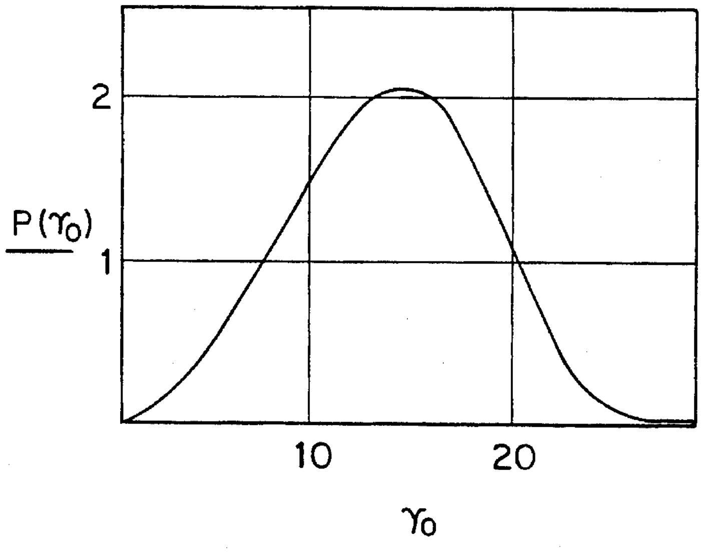
FIG. 3 shows the difference of the photodiode power received by the light detector from the stressed and unstressed light guide as a function of the half-aperture angle of the light detector, FIG. 4 schematically shows how the light detector is mounted opposite the end of the light guide.
Figure 4:
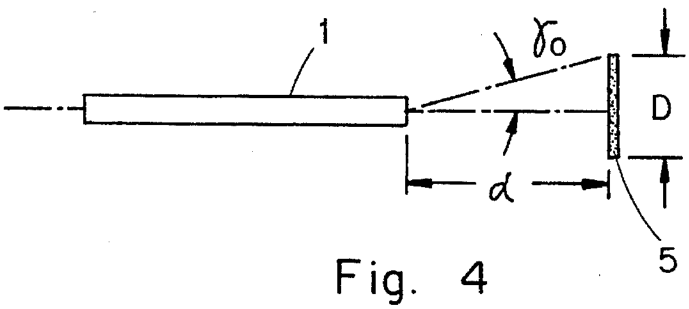

FIG. 3 shows the light detector difference, that is between the received photodiode power when the fiber optics 1 is stressed and unstressed as a function of an angle $\gamma_0$ subtended by the aperture defined by the distance d of the photodiode from the end of the fiber optics cable 1. FIG. 4 shows that $$\tan(\gamma_o) = \frac{D}{2d}. \tag{6}$$

As shown by FIG. 3, the photodiode 5 is so configured and mounted that it subtends an angle of aperture $2\gamma_0$ which includes the lower order modes. This feature can be implemented by appropriately adjusting the distance d from the fiber end and by suitably selecting the width D of the photodiode 5.

Figure 5:
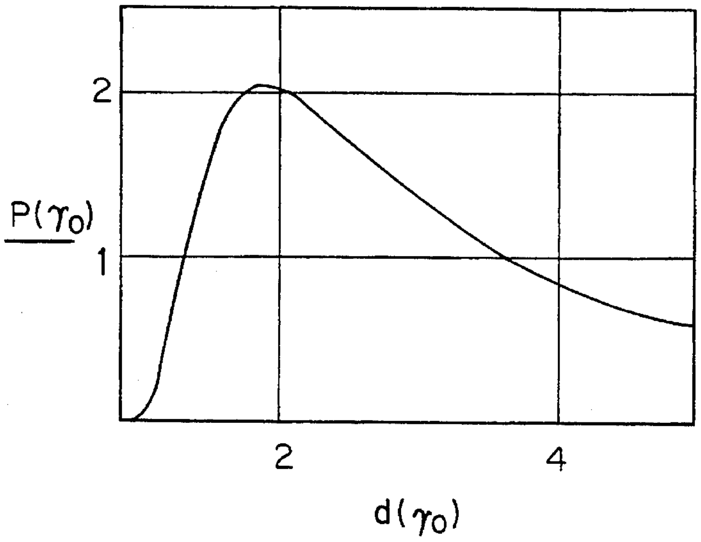
FIG. 5 shows the light power received by the light detector at a given stress and for a given detector size as a function of the distance between the detector and the end of the light guide.

There being a peak of the detected change in light power, as shown by FIG. 3, and this peak being in particular at about 15° when the half-aperture angle is between 12 and 18°, then there will be an optimal distance d for a given width of the photodiode 5, as shown in FIG. 5. By appropriately mounting the photodiode 5 in the optimal position shown in FIG. 5, maximum sensitivity of compression on the fiber optics 1 shall be achieved.

For the shown embodiment with HCS fibers of FIG. 3, the half aperture angle $\gamma_0$ is about 15° and as a result, with a diameter D=1 mm of the photodiode 5, the optimal distance d from the fiber end will be 2 mm according to eq. 6.

In general the aperture of the detector depends on the numerical aperture $A_n$ of the light guide system. The optimal value then follows from FIG. 4, namely $$\gamma_0 = \arcsin(A_n).$$

It follows that the optimal distance between the photodiode 5 and the end of the fiber optics cable 1 is $$d = \frac{D}{2\tan\gamma_o}.$$

Adequate sensitivity will be achieved if $\gamma_0$ falls within the range of approximately 0.9 to 1.2 $\arcsin(A_n)$, that is in the range of the distance d $$d = \frac{D/2}{(0.9 \rightarrow 1.2)\ A_n}.$$

In that case and for instance with $A_n$=0.25 and D=1 mm, $\gamma_0$ is between 12 and 18° and d is between 1.7 and 2.5 mm.

A laser diode as the light source with a corresponding especially narrow radiation lobe is especially preferred because only comparatively low-order modes are generated and hence the radiated power in the far field is concentrated in a small angular range. Thereby the difference between the stressed and unstressed states of the far-field distribution is enhanced and the detector sensitivity is raised.

Figure 6:
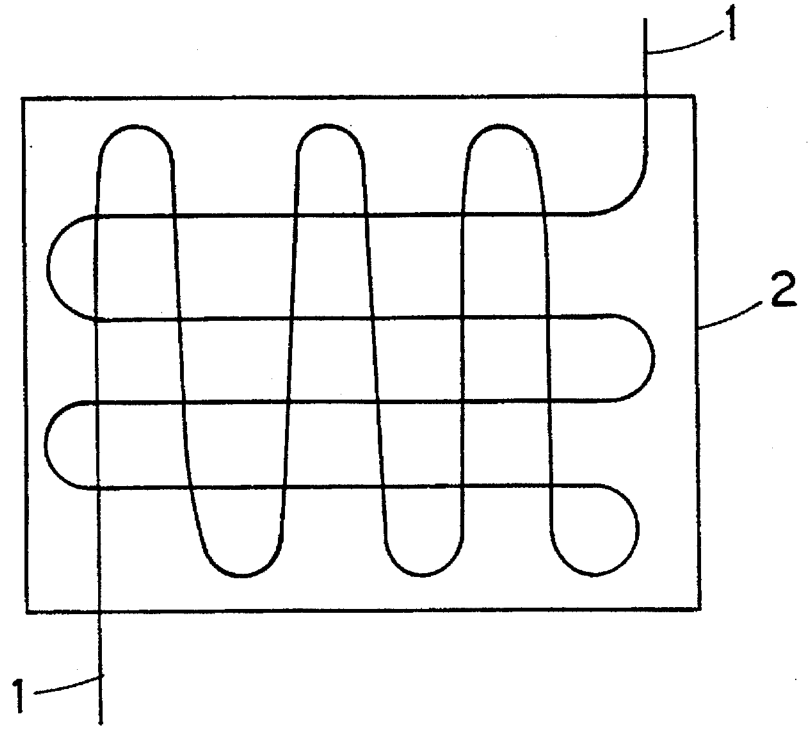
FIG. 6 is a further embodiment of the incorporation of the light guide in a contact pad.

The spatially periodic curvature of the stressed fiber optics cable 1, that is when a force is applied to a contact pad 2, also can be achieved by so arranging the fiber optics 1 in the contact pad 2 that it shall be self-crossing at spatially periodic spots in the manner shown in FIG. 6. In such a design the stress on the contact pad 2 is transmitted to the crossing points of one fiber part to the other fiber part, the latter being curved in the desired manner. The contact pad 2 itself may be free of topological shapes in this embodiment.

The above described pressure detectors may be used not only to signal that a person is stepping on the contact pad but also, by suitably balancing the analyzer, to detect the removal of compression, for instance the removal of an object from the contact pad and to deliver a corresponding output signal. The pressure detector also may be used in museums and galleries on walls with hung paintings, so that the removal of a painting and hence the elimination of the otherwise extant compression would trigger a corresponding alarm signal. The sensitivity is such that already changes in pressure of about 1 gm per 1 m of fiber length can be detected. Therefore such a detector is suitable as an antitheft device, to protect objects and the like. However it may also be used to weigh an object resting on the contact pad.

I claim:

1. An optical pressure detector comprising:

a multimode light guide affixed to a layer subjected to pressure and forming spatially periodic pressure points, said light guide being spatially periodically curved by the pressure on the layer, a light source and a light detector between which is mounted the light guide, an analyzer analyzing the light-detector output signals as a function of the pressure, wherein the light detector (5) covers an angle of aperture at the exit of the light guide (1) including only the lower-mode portion of the radiation field.

2. Detector defined in claim 1, wherein the portion of the radiation field being covered by the light detector (5) comprises 40 to 80% of the modes of the total radiation field.

3. Detector defined in claim 2, wherein the portion of the radiation field covered by the light detector (5) comprises 60% of the modes of the total radiation field.

4. Detector defined in claim 2, wherein the half aperture angle ($\gamma_0$) of the light detector (5) is between 0.8 arcsin ($A_n$) and 1.2 arcsin($A_n$), where $A_n$ is the numerical aperture of the light guide.

5. Detector defined in claim 4, wherein the half aperture angle ($\gamma_0$) of the light detector (5) is approximately between 12 and 18°.

6. Detector defined in claim 5, wherein the half angle of aperture ($\gamma_0$) is near 15°.

7. Detector defined in claim 1, wherein the portion of the radiation field covered by the light detector (5) is at least approximately 20% of the total radiation field.

8. Detector defined in claim 1, wherein the light guide includes a contact pad (2) disposed on the inside and at least on one side of the light guide (1) and includes, in the direction of the pressure, a spatially periodic configuration (3, 4) in the longitudinal direction of the light guide (1).

9. Detector defined in claim 8, wherein the light guide (1) is a fiber optics cable with a stepped index of refraction and in that the spatial period is selected in such manner that mode coupling takes place in the range of the lower order modes.

10. Detector defined in claim 9, wherein the spatial period is selected in such manner that mode coupling takes place in the range of the modes m=M/2, where M is the total number of modes.

11. Detector defined in claim 1, wherein a laser diode with a narrow radiation lobe is used as the light source.

12. Detector defined in claim 1, wherein the layer forming the spatially periodic pressure points is in the form of a grid and in that the light guide is stitched to the layer.

13. Detector defined in claim 1, wherein the layer to which the pressure is applied is fitted with a plurality of small plates for pressure transmission.

* * * * *